(12) United States Patent
Herrero Anton De Vez et al.

(10) Patent No.: US 12,135,735 B2
(45) Date of Patent: Nov. 5, 2024

(54) MANAGEMENT SYSTEM AND METHOD FOR A DISTRIBUTED MULTI-MODEL DATABASE ARCHITECTURE

(71) Applicants: Alma IT Systems, S.L, Barcelona (ES); Hugo Herrero Anton De Vez, Barcelona (ES)

(72) Inventors: Hugo Herrero Anton De Vez, Barcelona (ES); Ferran Garcia Casado, Barcelona (ES)

( * ) Notice: Subject to any disclaimer, the term of this patent is extended or adjusted under 35 U.S.C. 154(b) by 0 days.

(21) Appl. No.: 18/253,715

(22) PCT Filed: Apr. 23, 2021

(86) PCT No.: PCT/ES2021/070271
§ 371 (c)(1),
(2) Date: May 19, 2023

(87) PCT Pub. No.: WO2022/112624
PCT Pub. Date: Jun. 2, 2022

(65) Prior Publication Data
US 2023/0418839 A1    Dec. 28, 2023

(30) Foreign Application Priority Data

Nov. 27, 2020   (ES) .......................... ES202032593U

(51) Int. Cl.
*G06F 16/00* (2019.01)
*G06F 16/27* (2019.01)
*G06F 16/28* (2019.01)

(52) U.S. Cl.
CPC .......... *G06F 16/273* (2019.01); *G06F 16/284* (2019.01)

(58) Field of Classification Search
CPC ...... G06F 16/273; G06F 16/284; G06F 16/27; G06F 16/252
See application file for complete search history.

(56) References Cited

U.S. PATENT DOCUMENTS

| 2021/0182248 A1* | 6/2021 | Jayanthi | G06F 9/45558 |
| 2022/0300502 A1* | 9/2022 | Enver | G06F 16/2465 |

OTHER PUBLICATIONS

Daoud et al, "A multi-model based microservices identification approach", ScienceDirect, pp. 1-17 (Year: 2021).*
European Patent Office, International Search Report, mailed Aug. 20, 2021, in International Patent Application No. PCT/ES2021/070271, filed Apr. 23, 2021.
European Patent Office, Written Opinion, mailed Aug. 20, 2021, in International Patent Application No. PCT/ES2021/070271, filed Apr. 23, 2021.

(Continued)

*Primary Examiner* — Alexander Khong
(74) *Attorney, Agent, or Firm* — Thedford I. Hitaffer; Hitaffer & Hitaffer, PLLC

(57) ABSTRACT

A distributed multi-model database architecture comprises a plurality of user microservices configured to create, store and manage graph databases with sensitive data of pre-existing conventional databases. A management system for the distributed multi-model database architecture comprises a user interface, a plurality of profile microservices, a key-value database and a middleware. The distributed multi-model database architecture is managed by a method for managing the distributed multi-model database architecture.

9 Claims, 5 Drawing Sheets

(56) References Cited

OTHER PUBLICATIONS

De Santis Sandro et al: "Evolve the Monolith to Microservices with Java and Node", Dec. 5, 2016 (Dec. 5, 2016), pp. 1-132, XP055831625, Retrieved from the Internet: URL: https://www.redbooks.ibm.com/redbooks/pdfs/sg248358.pdf [retrieved on Aug. 11, 2021].

Carpenter Jeffrey: "Data Model Meets World, Part IV: How Many Databases? | Datastax", Oct. 25, 2020 (Oct. 25, 2020), pp. 1-8, XP055831558, Retrieved from the Internet: URL: https://web.archive.org./web/20201025230246 | https://www.datastax.com/blog/data-model-meets-world-part-iv-how-many-databases [retrieved on Aug. 11, 2021].

Kumar Roshan: "Selecting the Right Database for Your Microservices—The New Stack", Jan. 30, 2019 (Jan. 30, 2019), pp. 1-19, XP055831512, Retrieved from the Internet: URL: https://web.archive.org/web/20190130224759 | https://thenewstack.io/selecting-the-right-database-for-your-microservices/ [retrieved on Aug. 11, 2021].

\* cited by examiner

MANAGEMENT SYSTEM AND METHOD FOR A DISTRIBUTED MULTI-MODEL DATABASE ARCHITECTURE

CROSS-REFERENCE TO RELATED APPLICATIONS

This application, filed under 35 USC 371, is a United States National Stage Application of International Application No. PCT/ES2021/070271, filed Apr. 23, 2021, which claims priority to ES Application No. U202032593, filed on Nov. 27, 2020, the disclosures of which are incorporated herein by reference in their entirety.

OBJECT OF THE INVENTION

The present invention relates to a distributed multi-model database architecture, wherein the database architecture comprises a plurality of user microservices configured to create, store and manage graph databases with sensitive data of pre-existing conventional databases, a management system for the distributed multi-model database architecture, wherein the management system comprises a user interface, a plurality of profile microservices, a key-value database and a middleware, and a method for managing the distributed multi-model database architecture.

BACKGROUND OF THE INVENTION

Nowadays, the analysis, processing and exploitation of data is a blooming technical field with huge growth perspectives in the upcoming years, as the success of the leading companies in the field suggests. While many efforts have been directed to analyse consumer habits, other potential applications have attracted less attention; this is the case, for example, of medical data. Each patient has a lifelong record of diagnoses, treatments, clinical tests, and other valuable and sensitive data which is stored by the medical institutions or the patients themselves for decades. Being a very long-term storage of information, these records comprise different formats, ranging from printed hard copies with hand-written notes of physicians to the latest digital formats.

Furthermore, the records are usually scattered in different storages belonging to several hospitals, sometimes belonging to different jurisdictions. Even in the hospital itself, different type of data is stored in different servers that are designed under different medical standards and thus every one of these servers has a its own data architecture and communication protocols (DICOM, LOINC, RxNORM, SNOMED CT, etc.); moreover, each of those systems are developed and maintained by different providers giving more variability and complexity to the data integration. This fragmentation of the data is often a serious handicap for the collection, updating, or investigation of those records, whether considered as a single patient or as a collective. This data integration or data joints, usually occur on an application level making the data management complex, inefficient and very expensive, because of the necessity of configuring caches, intermediate data lakes and scaling databases and processing servers to conduct the data aggregations and translations.

It must be considered that the quantitative data provided by complementary tests (like radiology or laboratory analysis) are much more valuable if they are related to the rest of the patient's clinical record data; in fact, the value of the data is proportional to the number of meaningful relationships which can be established. Therefore, it is desirable to have a database that allows a simple search and update of the relationships between the different variables included in the patient's record.

Typically, most databases (DB) are structured as relational databases (RDB); these relational databases become especially complex and rigid when it comes to express relationships between data items, especially in the case of complex relationships, for example, when it is needed to obtain information from two or more related tables of the database (multilevel joins); incidentally, these multilevel joins are difficult to scale horizontally. Joins can efficiently compute statistics of existing database tables, but the multilevel join is too complex for large datasets. If it is needed to analyse a large amount of data, it would be needed to enumerate all related tuples of entities: "the cost of the enumeration approach is close to materializing the cartesian product of entity sets, which grows exponentially with the number of entity sets involved (Oliver and Zhensong, 2015; Das et al., 2015), (Vicknair et al., 2010; Partner et al., 2014)".

One possible approach would be to structure patient data in graph databases (GDB). Such GBD's are able to handle the actual complexity of dependencies between data. In addition, most machine learning (ML) algorithms work much better with vectorized implementations, such as those of the graph databases, and that implementation makes it much easier to use libraries to process data in parallel; since GDB's are usually represented using an affinity matrix, they share the same structure with machine learning vectorized applications. Further, functions in a graph can be represented as a vector, which brings on another advantage: graph analysis algorithms can be implement directly on graph databases, allowing to execute ML and graph analysis techniques in the same environment, enabling a tight cooperation between each other, for example feeding the ML algorithms with graphical metrics calculated as predictive variables; thus, the same environment might be used to carry out information analysis and efficient and even compartmentalized searches, keeping the privacy of the patient's information.

While RDB's are optimized for data aggregation, other non-relational databases focus on the volume and properties of data; for example, GDB's are optimized for data connections: compared to other models, GDB's are designed for managing a high level of data complexity, in part because the structure of the data is not fixed in advance. But not all of it are advantages: GDB's are also more expensive, and there are fewer available tools for conducting complex operations in a production environment or maintenance services.

DESCRIPTION OF THE INVENTION

In a first inventive aspect the invention provides a management system for a distributed multi-model database architecture, the distributed multi-model database architecture comprising a plurality of user microservices, each connected with a database of a plurality of pre-existing relational databases stored in respective servers, wherein
  each user microservice is associated to a user,
  each user microservice is configured to create, store and manage a graph database, comprising nodes and edges, with data related to the associated user from the pre-existing database connected to the user microservice,
  each user microservice comprises an encrypted file decryptable by the user microservice and containing instructions to create and store the graph database with data related to the associated user, each user microservice is stored in the server of the pre-existing database connected to the user microservice, and the graph database is configured to be accessed only through the user microservice;

wherein the management system is stored in a cloud server and wherein the management system comprises:

a user interface, a plurality of profile microservices, wherein each profile microservice is associated to a single, distinct user, wherein each profile microservice is connected with at least another profile microservice, and wherein each profile microservice is configured to decrypt the encrypted files of the user microservices associated to the same user to which the profile microservice is associated, a key-value database, connected with the profile microservices, and configured to store hashed location data of each graph database, hashed location data of the profile microservices, and hashed location data of the user microservices, and a middleware, configured to connect the user microservices and the profile microservices.

The management system provides a centralized access to data stored in a plurality of independent, distributed, multimodel pre-existing databases, with a high degree of security and without the loss of ownership by the rightful owner of the data; the database architecture provides, for each pre-existing database, or node, a plurality of user microservices tasked with creating a user-specific graph database (GDB) exclusively with user related data from the pre-existing database, and managing the access and communication with the management system. The data of the graph database is stored in the pre-existing database server and encrypted. The management system is only allowed to access the user microservices, and receives encrypted data, without ever gaining access to the rest of the data in the pre-existing database; therefore a high level of security is attained.

Each profile microservice is associated to a single user, which preferably holds the ownership of, or is duly authorised to access certain data in the pre-existing databases. In a conventional arrangement, the user would have to access the individual databases and manually extract the relevant information, if the entity hosting the databases allows so. This creates two major problems: first, once a user is granted access to the database, he can access any register in the database, including sensitive data of other users, thus jeopardizing the privacy and security of the database; and second, the user would have to manually request and extract relevant data from each individual database; as a result, extracting data from several databases would be costly in time and resources.

The present invention overcomes such difficulties and provides a centralized database management system with a single authentication process through a user interface, a key-value database with an index with the locations of each user data, and a middleware managing the communication between the management system and the distributed database architecture. The profile microservices provide for a comprehensive management of the permissions, the data requests and the communications with the database architecture. The management system is hosted by a cloud server; by cloud server should be understood a computer or computer system comprising a processor, storage means and Internet access, and configured to host and run the database management system.

Throughout the present document, microservice should be understood as each of the software applications or elements of a microservice structure, as known in the art. In the present invention, all the microservices are related to users; for example, there can only exist a single profile microservice for each user, whereas there might be more than one user microservice per user; in particular, for each user there is a user microservice per node. The names profile and user should be understood as mere convenience denominations for a first class of microservices and a second class of microservices. The profile microservice will always have a higher hierarchy than the user microservice, and will have the authority to read the encrypted files generated by the user microservices.

A graph database, or GDB, should be understood as either a non-relational database or a pure graph database, comprising nodes and vectors, and storing user-related data; the nodes of a GDB should be understood as vertices of the graph, or discrete data elements linked by vectors or edges to other vertices, and are different to the nodes which refer to the pre-existing databases.

The key-value database, should be understood as a hash table comprising at least an index of the location of each data record stored in the graph databases related to each unique user, as well as other relevant data.

The middleware is an element configured to enable and manage the communication and the transfer of data between the database architecture, in particular the user microservices, and the management system.

The present invention is of particular interest to the management of patient records in a health system with a plurality of loosely related or independent databases pertaining to autonomous or independent health institutions. A patient, rightful owner of relevant data such as patient records, medical history, etc., can access the information stored in separate hospital databases and retain the ownership of that data; furthermore, a doctor, medical practitioner, or the like, can access the data of their patients as well, providing that the medical practitioner has been granted permissions by the rightful owner of the data.

In a particular embodiment, the user interface is a web-based user interface. A web-based interface ensures that any user can access the information from anywhere in the world, providing that the user possesses the required permissions.

In a particular embodiment, the key-value database is configured as a distributed ledger. More particularly the key value database is configured as a blockchain distributed ledger, such that any attempt to manipulate the stored information by a malicious user can be noticed and tracked by an authorised user.

In a particular embodiment, the key-value database comprises key-value pairs encrypted with a public-key encryption algorithm. As an additional security measure, the key-value database is encrypted using an asymmetric cryptography system, including at least one public key and one private key.

In a particular embodiment, the key-value database comprises a key-value database manager.

In a particular embodiment, the system further comprises a low availability back-up database controlled by the middleware.

In a particular embodiment, the middleware is partly stored in a server of the pre-existing database. Advantageously, part of the middleware is distributed over the nodes of the pre-existing database servers, and stored in the corresponding database servers, with a higher degree of integration.

In a particular embodiment, the middleware is configured as a peer-to-peer network.

In a particular embodiment, the middleware is configured to perform asynchronous, masterless replication between nodes of the graph databases.

In a particular embodiment, the middleware is configured to perform multicast queries according to a round-robin scheduling.

In a particular embodiment, at least a profile microservice comprises an intermediate database configured to store data from the graph databases, hashed location data of the user microservices, and/or decryption keys. The intermediate databases are small volume, user-specific databases for the storage of various data, such as locations of the microservices and encryption/decryption keys; these intermediate databases work as local storages for information and enable a faster access to a query of a user.

In a second inventive aspect, the invention provides a computer system comprising a cloud server configured to store and execute the management system according to the first inventive aspect. The computer system comprises at least a cloud server with Internet connection, and optionally additional computers and/or similar devices such as hand-held devices, tablets, smartphones, and the like.

In a third inventive aspect, the invention provides a distributed multi-model database architecture, comprising a plurality of user microservices, each connected with a database of a plurality of pre-existing relational databases stored in respective servers, wherein
- each user microservice is associated to a user,
- each user microservice is configured to create, store and manage a graph database, comprising nodes and edges, with data related to the associated user from the pre-existing database connected to the user microservice,
- each user microservice comprises an encrypted file decryptable by the user microservice and containing instructions to create and store the graph database with data related to the associated user, and
- each user microservice is stored in the server of the pre-existing database connected to the user microservice,
- the graph database is configured to be accessed only through the user microservice.

The user microservices make use of respective encrypted files to create or build the graph database; such encrypted file comprises the specific instructions for the task and are encrypted to avoid security threats. Thus, the distributed multi-model database architecture advantageously provides for a surrogate database with a standardized model, regardless of the type of pre-existing databases.

In a particular embodiment, the encrypted file is encrypted with a public-key encryption algorithm. Public-key encryption algorithms advantageously provide with a highly secure asymmetric encryption system capable of withstanding most attack attempts without requiring a high processing load or processing times.

In a particular embodiment, the encrypted file comprises one or more of the following: user data, hashes, metadata, encryption keys. The encrypted file advantageously stores the instructions to create, or build, the graph database, and other useful data which ensure access to the graph database and the security of the information; further, the encrypted file can store directly certain data, rather than simply pointing to a different address.

In a particular embodiment, the encrypted file is encoded as a JSON file. The JSON-formatted file preferably comprises the instructions to create, or build, the graph database, as well as hashed locations, metadata, and encryption keys for encrypted data which is not stored directly in the graph database; examples of such data not directly stored in the graph database are DICOM files, high resolution videos or large files.

In a particular embodiment, the data of the graph databases are encrypted with a public-key encryption algorithm. Advantageously, the encryption of the data of the GDB avoids any possible attack from a malicious user accessing the database.

In a particular embodiment, the data of the graph databases are encoded according to DICOM and/or HL7 FHIR medical standards. The compliance with the medical standards, such as DICOM and/or HL7 FHIR ensures the compatibility of data from different sources, such as data from the internal databases of hospitals, clinics, research centres and/or universities. Additionally, in an embodiment, the middleware comprises export interfaces configured to issue standard compliant files with data from the databases.

In a particular embodiment, the data of the graph databases are encoded as JSON files. JSON format is a highly versatile file format which ensures the interoperability of the microservices and the compatibility with the pre-existing databases.

In a fourth inventive aspect, the invention provides a method for managing a distributed multi-model database architecture according to the third inventive aspect with a management system according to the first inventive aspect, wherein the method comprises the steps of:
- receiving, by a profile microservice, a data request from a user interface,
- requesting, by a profile microservice, the data location in one or more graph databases to the key-value database,
- transferring, by a profile microservice, the data request and the data location to the middleware,
- transferring, by the middleware, the data request to one or more user microservices of the graph databases where the requested data is stored,
- receiving, by the middleware, encrypted data from the one or more user microservices,
- transferring, by the middleware, the encrypted information to the profile microservice.

In a fifth inventive aspect, the invention provides a computer readable medium comprising instructions which, when executed by a computer, cause the computer to carry out the steps of:
- receiving, by a profile microservice, a data request from a user interface,
- requesting, by a profile microservice, the data location in one or more graph databases to the key-value database,
- transferring, by a profile microservice, the data request and the data location to the middleware,
- transferring, by the middleware, the data request to one or more user microservices of the graph databases where the requested data is stored,
- receiving, by the middleware, encrypted data from the one or more user microservices,
- transferring, by the middleware, the encrypted information to the profile microservice.

DESCRIPTION OF THE DRAWINGS

The foregoing and other advantages and features will be more fully understood from the following detailed description of exemplary embodiments with reference to the accompanying drawings, which should be considered by way of illustration and not limitation, in which.

PREFERRED EMBODIMENT OF THE INVENTION

The invention is particularly suited for the management of medical data stored in a plurality of local databases of medical institutions, such as hospitals, clinics and the like; these databases usually contain data from a high number of patients and mostly contain sensitive data; in conventional architectures, the access to the data of a single patient would entail granting access to the whole set of data of all patients, as well as requiring obtaining individual access to each database. Accordingly, the users are patients, but also physicians and researchers willing to obtain anonymous data from a wide range of sources.

Figure 1:
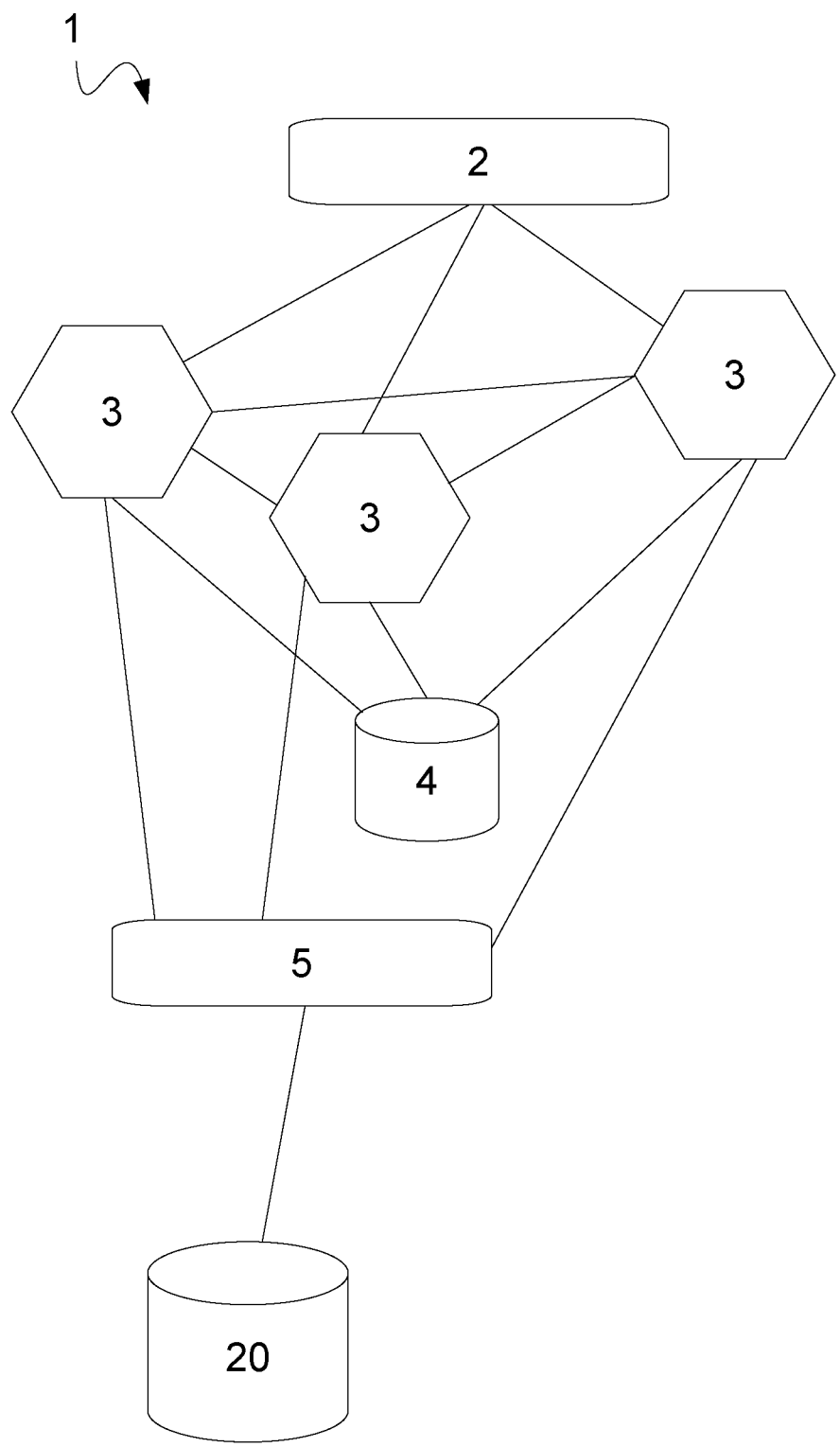
FIG. 1 shows a preferred embodiment of the management system.

FIG. 1 shows a preferred embodiment of the management system (1); the management system (1) comprises a plurality of profile microservices (3), of which only three are depicted in this figure, connected between each other and to the user interface (2). The user interface (2) is preferably a web app, accessible from any device with internet connection.

In one embodiment, the profile microservices (3) are clustered by containers of a set of platform as a service (PaaS) software products that use Operative System level virtualization to deliver software in packages called containers. These containers are isolated from one another and bundle their own software, libraries and configuration files; the containers can communicate with each other through well-defined channels. All containers are run by a single operating system kernel and therefore use fewer resources than virtual machines. The profile microservices (3) also comprise an intermediate database in case the user wishes to store data permanently to the cloud server (10). In practice, the profile microservices (3) act as a virtual representation of the users and have full authority over the user-owned data.

In this example, the key-value database (4) is a blockchain based hash table with the location of the data of each user on the database architecture (20). The middleware (5) is a distributed, NoSQL database management system with peer-to-peer architecture that provides high availability between multiple data nodes, with asynchronous masterless replication between nodes installed within local databases (30) and the management system (1). The middleware (5) can run multicast queries to a number of user microservices (11) by a round-robin scheduling system; the only user microservices (11) that answer to the query, are the user microservices (11) that contain the data and have been authorized by the user to share it.

Figure 3:
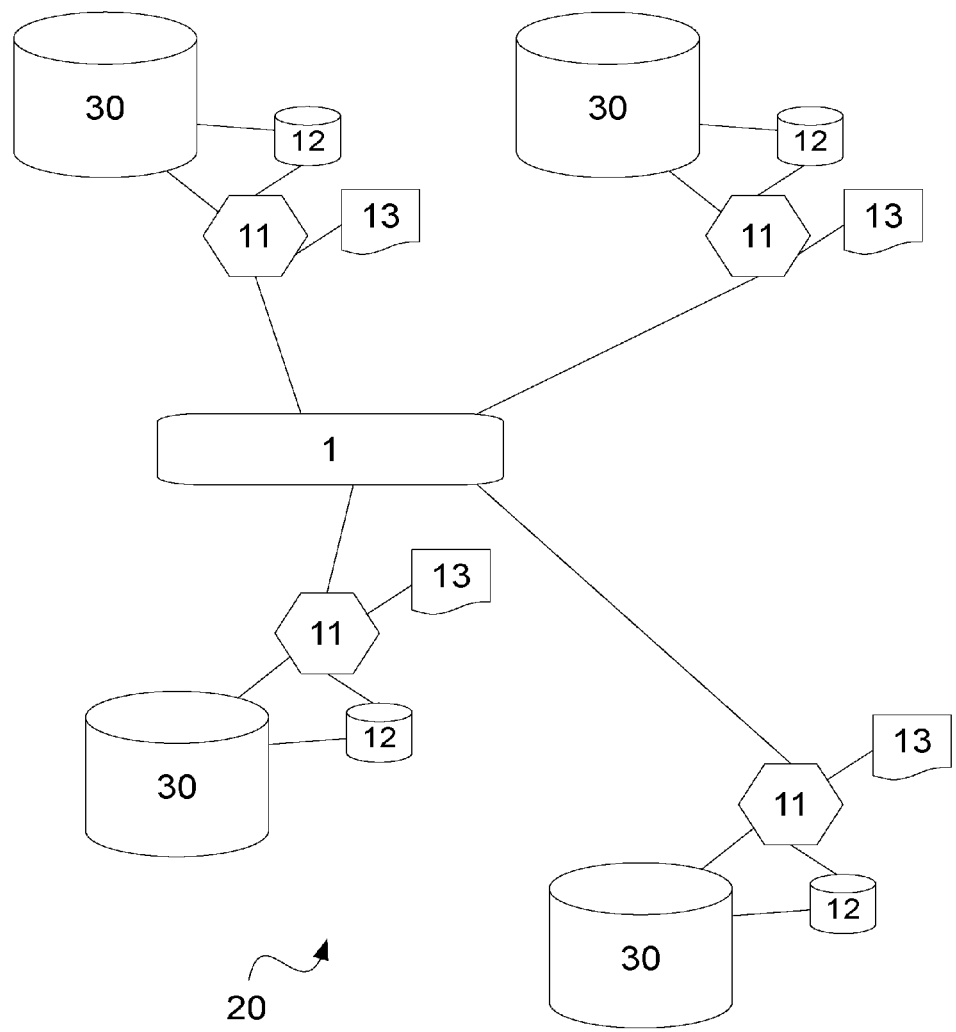
FIG. 3 shows another aspect of an embodiment of the database architecture.

The general schema of the distributed multi-model database architecture (20) is shown in FIG. 3, which depicts four databases (30) or nodes. The distributed multi-model database architecture (20) is essentially a federated database with a plurality of pre-existing relational databases (30) which data is managed on a user-basis by a plurality of user microservices (11), in such a fashion that only certain data owned by the user is extracted from the database (30), rearranged in a user specific graph database (12) and encrypted with a public-key algorithm, all according to the instructions of an encrypted file (13).

Figure 2:
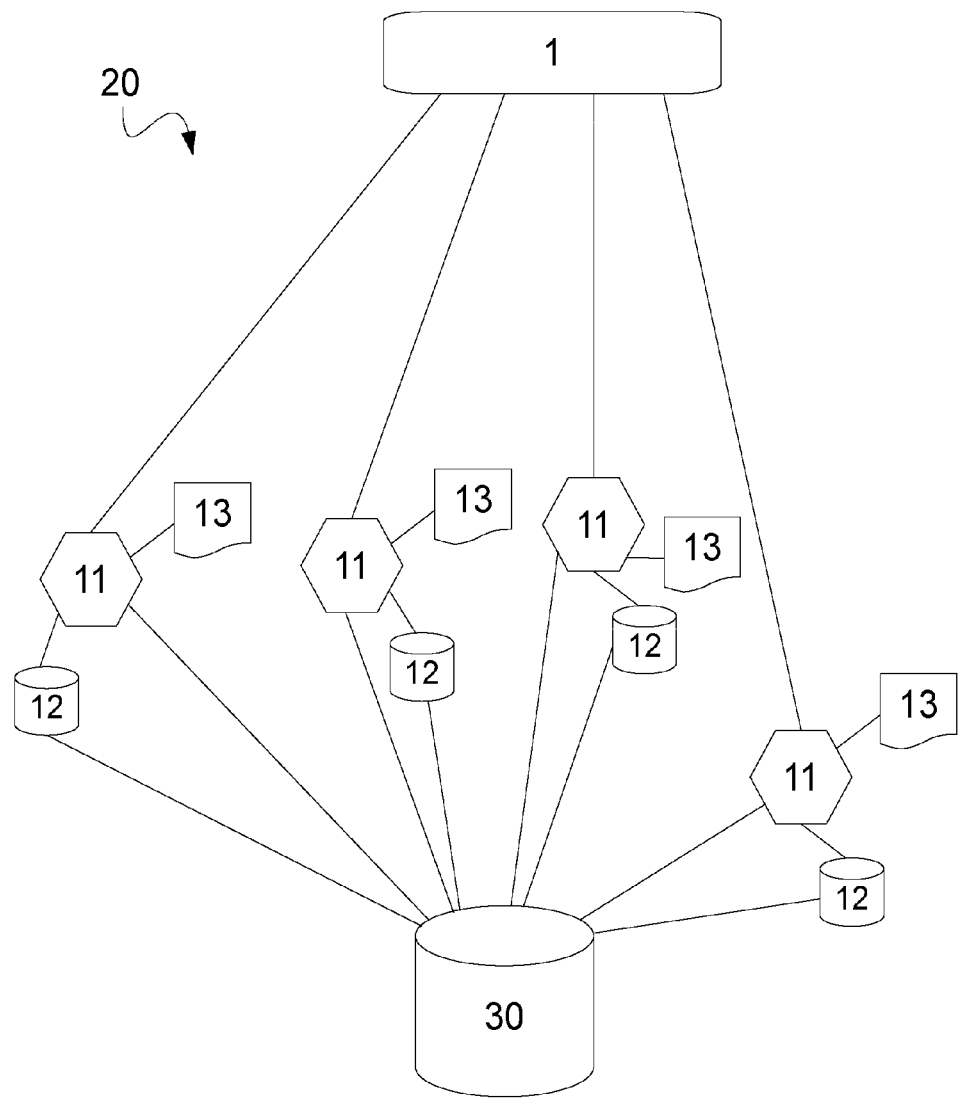
FIG. 2 shows a preferred embodiment of the database architecture.

FIG. 3 shows a simplified view of the database architecture (20) with four databases (30) and a single user microservice (11) per database (30), while normally each database (30) will be associated to a plurality of microservices (11), usually one per user. FIG. 2 shows a view of a possible embodiment of one of the nodes of the database architecture (20), with a single database (30) and four user microservices (11); also, each user microservice (11) is connected to its corresponding graph database (12) and encrypted file (13).

Figure 4:
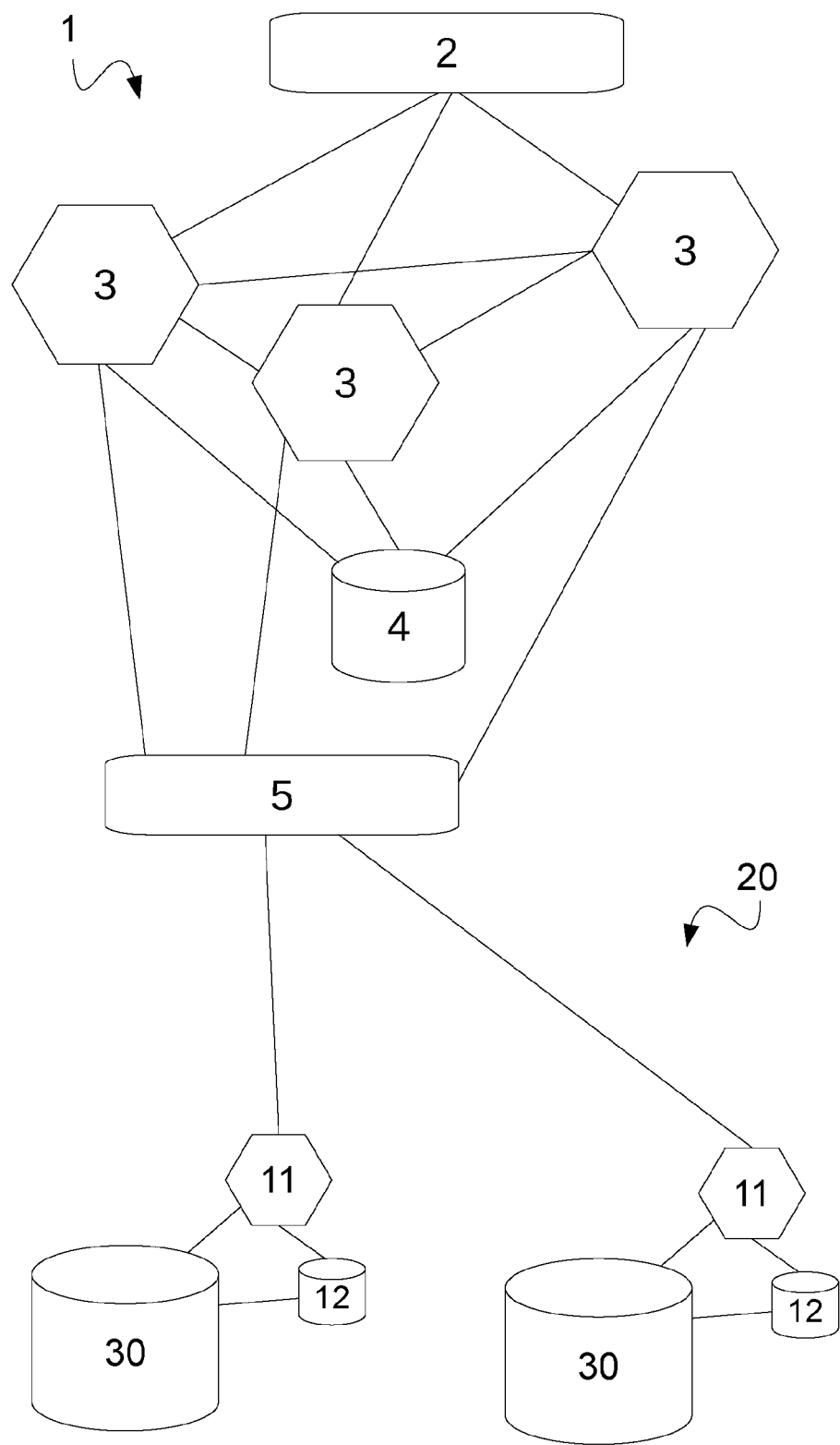
FIG. 4 shows a preferred embodiment of the management system and the database architecture.

FIG. 4 shows the management system (1) together with the distributed multi-model database architecture (20), represented by only two nodes.

Figure 5:
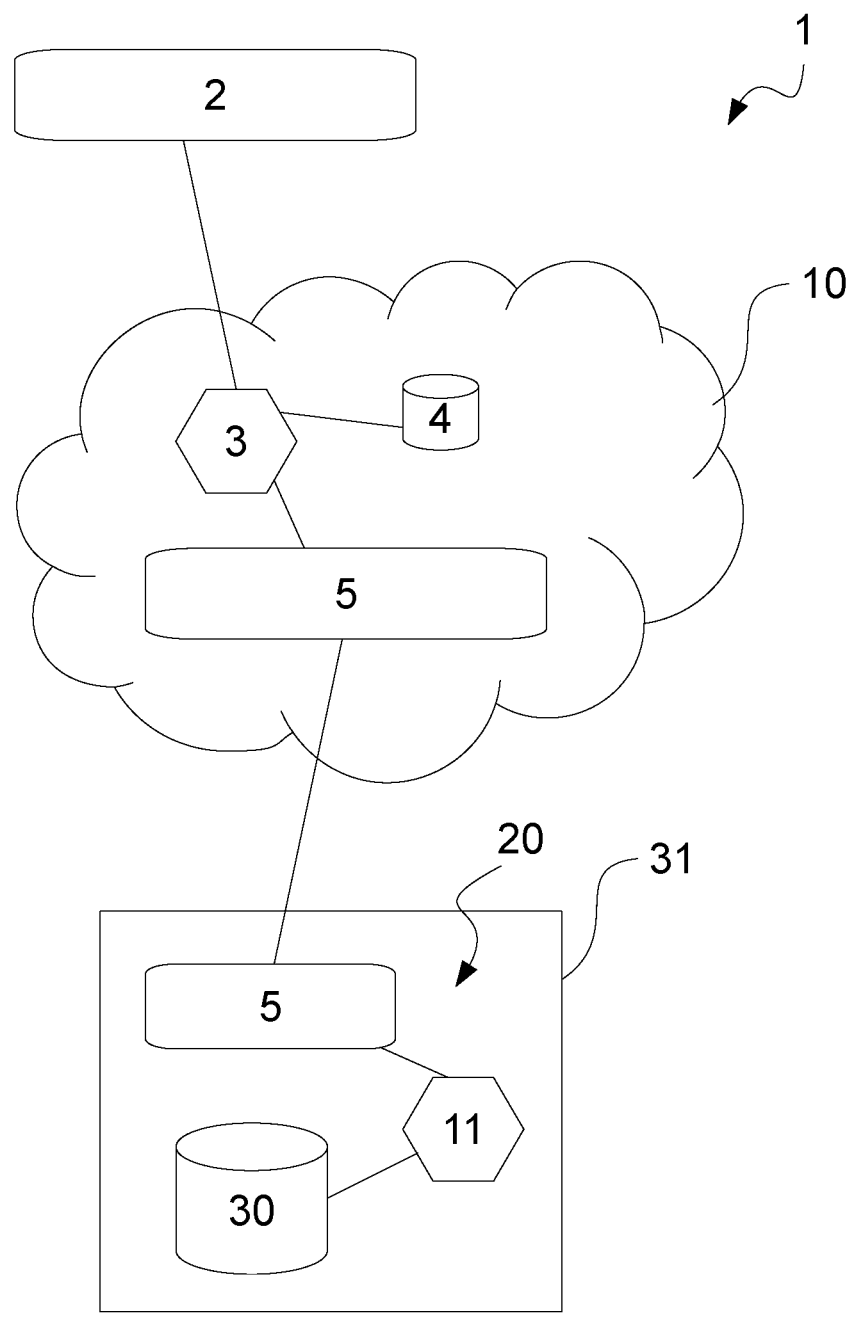
FIG. 5 shows the physical structure of the management system and the database architecture.

FIG. 5 shows a preferred implementation of the management system (1) and the distributed database architecture (20); the figure shows the profile microservice (3), the key-value database (4) and part of the middleware (5) hosted in the cloud server (10); the user interface (2) is this example a web app. In the other hand, the database servers (31), only one unit depicted in FIG. 5, host the user microservices (11), only one unit depicted in FIG. 5, the pre-existing database itself (30) and a part of the middleware (5).

In the graph database (12), the data structure is implemented by a graph with tree-like structure in documents storing references to "parent" nodes in children nodes. The "parent references pattern" stores each tree node in a document; in addition to the tree node, the document stores the identification, or ID, of the node's parent. The key challenge in data modelling is balancing the needs of the application, the performance characteristics of the database engine, and the data retrieval patterns. Unlike SQL, or conventional, databases, where a table's schema must be determined and declared before inserting data, graph database collections, by default, do not require its documents to have the same schema. The documents in a single collection do not need to have the same set of fields and the data type for a field can differ across documents within a collection. To change the structure of the documents in a collection, such as add new fields, remove existing fields, or change the field values to a new type, update the documents to the new structure. This flexibility facilitates the mapping of documents to an entity or an object. Each document can match the data fields of the represented entity, even if the document has substantial variation from other documents in the collection. The key decision in designing data models for graph database applications revolves around the structure of documents and how the application represents relationships between data.

In a preferred example, the database architecture (20) not only is compliant with medical standards such as DICOM and HL7, the middleware (5) also comprises export interfaces to those formats, such that the database architecture (20) is fully compatible with the existing hospital system and independent of the software service providers.

Furthermore, the access to the data is only possible through the user microservices (11), and providing that the request is duly authorised with the corresponding key. The data is encrypted in such a way that the profile microservices (3) always have a higher authority to decrypt the data.

The data location is known through the hierarchy established by the tree, and the cost that it has to come from a node to another to build our data structure needed in each moment. Accordingly, the Dijkstra algorithm is the preferred algorithm to build the data network. It will be used a minimum path algorithm, that is, an algorithm for the determination of the shortest path between nodes. Once the location of the files in each of the nodes (hospitals) is known, it is possible to run the algorithm to reconstruct the same data tree. If any of the nodes suffer changes in the file paths, we will have to rebuild the tree using the same pattern.

In order to request a data record upon request of a duly authorised user, the management system (1) executes these steps:
- receiving, by a profile microservice (3), a data request from a user interface (2),
- requesting, by a profile microservice (3), the data location in one or more graph databases (12) to the key-value database (4),
- transferring, by a profile microservice (3), the data request and the data location to the middleware (5),
- transferring, by the middleware (5), the data request to one or more user microservices (11) of the graph databases (12) where the requested data is stored,
- receiving, by the middleware (5), encrypted data from the one or more user microservices (11),
- transferring, by the middleware (5), the encrypted information to the profile microservice (3).

Clauses of the Invention

1. Management system (1) for a distributed multi-model database architecture (20), the distributed multi-model database architecture (20) comprising a plurality of user microservices (11), each connected with a database (30) of a plurality of pre-existing relational databases (30) stored in respective servers (31), wherein
   - each user microservice (11) is associated to a user,
   - each user microservice (11) is configured to create, store and manage a graph database (12), comprising nodes and edges, with data related to the associated user from the pre-existing database (30) connected to the user microservice,
   - each user microservice comprises an encrypted file (13) decryptable by the user microservice (11) and containing instructions to create and store the graph database (12) with data related to the associated user,
   - each user microservice (11) is stored in the server (31) of the pre-existing database (30) connected to the user microservice (11), and
   - the graph database (12) is configured to be accessed only through the user microservice (11);

wherein the management system (1) is stored in a cloud server (10) and wherein the management system (1) comprises:
   - a user interface (2),
   - a plurality of profile microservices (3), wherein each profile microservice (3) is associated to a single, distinct user, wherein each profile microservice (3) is connected with at least another profile microservice (3), and wherein each profile microservice (3) is configured to decrypt the encrypted files (13) of the user microservices (11) associated to the same user to which the profile microservice (3) is associated,
   - a key-value database (4), connected with the profile microservices (3), and configured to store hashed location data of each graph database (12), hashed location data of the profile microservices (3), and hashed location data of the user microservices (11), and a middleware (5), configured to connect the user microservices (11) and the profile microservices (3).

2. Management system (1) according to the previous clause, wherein the user interface (2) is a web-based user interface.

3. Management system (1) according to any of the previous clauses, wherein the key-value database (4) is configured as a distributed ledger.

4. Management system (1) according to any of the previous clauses, wherein the key-value database (4) comprises key-value pairs encrypted with a public-key encryption algorithm.

5. Management system (1) according to any of the previous clauses, wherein the key-value database (4) comprises a key-value database manager.

6. Management system (1) according to any of the previous clauses, further comprising a low availability back-up database controlled by the middleware (5).

7. Management system (1) according to any of the previous clauses, wherein the middleware (5) is partly stored in a server (31) of the pre-existing database (30).

8. Management system (1) according to any of the previous clauses, wherein the middleware (5) is configured as a peer-to-peer network.

9. Management system (1) according to any of the previous clauses, wherein the middleware (5) is configured to perform asynchronous, masterless replication between nodes of the graph databases (12).

10. Management system (1) according to any of the previous clauses, wherein the middleware (5) is configured to perform multicast queries according to a round-robin scheduling.

11. Management system (1) according to any of the previous clauses, wherein at least a profile microservice (3) comprises an intermediate database configured to store data from the graph databases (12), hashed location data of the user microservices (11), and/or decryption keys.

12. Computer system comprising a cloud server (10) configured to store and execute the management system (1) according to clauses 1-11.

13. Distributed multi-model database architecture (20), comprising a plurality of user microservices (11), each connected with a database (30) of a plurality of pre-existing relational databases (30) stored in respective servers (31), wherein
    - each user microservice (11) is associated to a user,
    - each user microservice (11) is configured to create, store and manage a graph database (12), comprising nodes and edges, with data related to the associated user from the pre-existing database (30) connected to the user microservice (11),
    - each user microservice (11) comprises an encrypted file (13) decryptable by the user microservice (11) and containing instructions to create and store the graph database (12) with data related to the associated user, and
    - each user microservice (11) is stored in the server (31) of the pre-existing database (30) connected to the user microservice (11),
    - the graph database (12) is configured to be accessed only through the user microservice (11).

14 Distributed multi-model database architecture (20) according to the previous clause, wherein the encrypted file (13) is encrypted with a public-key encryption algorithm.

15. Distributed multi-model database architecture (20) according to any of clauses 13-14, wherein the encrypted file (13) comprises one or more of the following: user data, hashes, metadata, encryption keys.

16. Distributed multi-model database architecture (20) according to any of clauses 13-15, wherein the encrypted file (13) is encoded as a JSON file.
17. Distributed multi-model database architecture (20) according to any of clauses 13-16, wherein the data of the graph databases (12) are encrypted with a public-key encryption algorithm.
18. Distributed multi-model database architecture (20) according to any of clauses 13-17, wherein the data of the graph databases (12) are encoded according to DICOM and/or HL7 FHIR medical standards.
19. Distributed multi-model database architecture (20) according to any of clauses 13-18, wherein the data of the graph databases (12) are encoded as JSON files.
20. Method for managing a distributed multi-model database architecture (20) according to any of clauses 13 to 19 with a management system (1) according to any of clauses 1 to 11, wherein the method comprises the steps of:
    receiving, by a profile microservice (3), a data request from a user interface (2),
    requesting, by a profile microservice (3), the data location in one or more graph databases (12) to the key-value database (4),
    transferring, by a profile microservice (3), the data request and the data location to the middleware (5),
    transferring, by the middleware (5), the data request to one or more user microservices (11) of the graph databases (12) where the requested data is stored,
    receiving, by the middleware (5), encrypted data from the one or more user microservices (11),
    transferring, by the middleware (5), the encrypted information to the profile microservice (3).
21. Computer readable medium comprising instructions which, when executed by a computer, cause the computer to carry out the steps of:
    receiving, by a profile microservice (3), a data request from a user interface (2),
    requesting, by a profile microservice (3), the data location in one or more graph databases (12) to the key-value database (4),
    transferring, by a profile microservice (3), the data request and the data location to the middleware (5),
    transferring, by the middleware (5), the data request to one or more user microservices (11) of the graph databases (12) where the requested data is stored,
    receiving, by the middleware (5), encrypted data from the one or more user microservices (11),
    transferring, by the middleware (5), the encrypted information to the profile microservice (3).

The invention claimed is:

1. Management system for a distributed multi-model database architecture, the distributed multi-model database architecture comprising a plurality of user microservices, each connected with a database of a plurality of pre-existing relational databases stored in respective servers, wherein
    each user microservice is associated to a user,
    each user microservice is configured to create, store and manage a graph database, comprising nodes and edges, with data related to the associated user from the pre-existing database connected to the user microservice,
    each user microservice comprises an encrypted file decryptable by the user microservice and containing instructions to create and store the graph database with data related to the associated user,
    each user microservice is stored in the server of the pre-existing database connected to the user microservice, and
    the graph database is configured to be accessed only through the user microservice;
wherein the management system is stored in a cloud server and wherein the management system comprises:
    a user interface,
    a plurality of profile microservices, wherein each profile microservice is associated to a single, distinct user, wherein each profile microservice is connected with at least another profile microservice, and wherein each profile microservice is configured to decrypt the encrypted files of the user microservices associated to the same user to which the profile microservice is associated,
    a key-value database, connected with the profile microservices, and configured to store hashed location data of each graph database, hashed location data of the profile microservices, and hashed location data of the user microservices, and
    a middleware, configured to connect the user microservices and the profile microservices;
wherein the key-value database is configured as a distributed ledger and comprises key-value pairs encrypted with a public-key encryption algorithm; and
wherein at least a profile microservice comprises an intermediate database configured to store data from the graph databases, hashed location data of the user microservices, and decryption keys;
characterized by the management system being configured for:
    receiving, by a profile microservice, a data request from a user interface,
    requesting, by a profile microservice, the data location in one or more graph databases to the key-value database,
    transferring, by a profile microservice, the data request and the data location to the middleware,
    transferring, by the middleware, the data request to one or more user microservices of the graph databases where the requested data is stored,
    receiving, by the middleware, encrypted data from the one or more user microservices,
    transferring, by the middleware, the encrypted information to the profile microservice.

2. Management system according to claim 1, wherein the user interface is a web-based user interface.

3. Management system according to claim 1, wherein the key-value database comprises a key-value database manager.

4. Management system according to claim 1, further comprising a low availability back-up database controlled by the middleware.

5. Management system according to claim 1, wherein the middleware is partly stored in a server of the pre-existing database.

6. Management system according to claim 1, wherein the middleware is configured as a peer-to-peer network.

7. Management system according to claim 1, wherein the middleware is configured to perform asynchronous, masterless replication between nodes of the graph databases.

8. Management system according to claim 1, wherein the middleware is configured to perform multicast queries according to a round-robin scheduling.

9. Computer system comprising a cloud server configured to store and execute the management system according to claim 1.

\* \* \* \* \*